United States Patent [19]

Pekin et al.

[11] Patent Number: 5,706,080
[45] Date of Patent: Jan. 6, 1998

[54] SINGLE TEST STATION THAT CAN TEST A FLYING HEIGHT AND ELECTRICAL CHARACTERISTICS OF A RECORDING HEAD

[75] Inventors: David F. Pekin; Ashok Machcha, both of San Diego, Calif.

[73] Assignee: Phase Metrics, San Diego, Calif.

[21] Appl. No.: 762,136

[22] Filed: Dec. 9, 1996

[51] Int. Cl.$^6$ ................................................ G01N 21/00
[52] U.S. Cl. ........................... 356/72; 356/243; 356/357; 369/55; 324/73.1; 360/103
[58] Field of Search ........................... 356/72, 243, 382, 356/357; 324/73.1, 454; 369/53, 58, 55; 360/103

[56] References Cited

U.S. PATENT DOCUMENTS

| | | | |
|---|---|---|---|
| 3,683,273 | 8/1972 | Behr et al. | 360/103 |
| 4,479,090 | 10/1984 | Frater et al. | 324/454 |
| 4,777,544 | 10/1988 | Brown et al. | 360/103 |

*Primary Examiner*—Frank G. Font
*Assistant Examiner*—Jason D. Vierra-Eisenberg
*Attorney, Agent, or Firm*—Blakely Sokoloff Taylor & Zafman

[57] ABSTRACT

A tester which can measure both the air bearing thickness and the dynamic electrical characteristics of a head gimbal assembly (HGA) of a hard disk drive. The tester has a disk that is rotated by a spindle motor. The disk has a transparent portion that is used to measure the air bearing thickness and a magnetic portion that used to measure the electrical characteristics. The HGA is moved adjacent to the transparent and magnetic portions by a loader mechanism. The HGA is separated from the rotating disk by an air bearing. The tester has an optical system which measures the thickness of the air bearing when the HGA is adjacent to the transparent portion of the disk. The tester also has an electrical tester which measures the electrical characteristics when the HGA is adjacent to the magnetic portion. The loader mechanism moves the HGA between the transparent and magnetic portions so that the air bearing thickness and the electrical characteristics of an HGA can be measured in the same tester.

7 Claims, 4 Drawing Sheets

SINGLE TEST STATION THAT CAN TEST A FLYING HEIGHT AND ELECTRICAL CHARACTERISTICS OF A RECORDING HEAD

BACKGROUND OF THE INVENTION

1. Field of the Invention

The present invention relates to a tester which can measure both an air bearing thickness and electrical characteristics of a recording head.

2. Description of Related Art

Hard disk drives contain magnetic recording heads that magnetize and sense the magnetic field of a rotating disk(s). The recording heads are assembled in a head-gimbal assembly (HGA) that is mounted to an actuator arm that can move the heads relative to the disk. The HGA has hydrodynamic features that create an air bearing between the recording head and the disk. The air bearing minimizes mechanical wear between the head and the disk surface. To optimize electrical performance it is desirable to maintain a minimum air bearing thickness. HGA's are therefore designed to have minimum and maximum air bearing thicknesses.

The air bearing of an HGA is typically measured with an apparatus commonly referred to as a flying height tester. Flying height testers contain a loader mechanism which places an HGA adjacent to a transparent disk. The transparent disk is rotated by a spindle motor that is mounted to a test stand. The tester also has a light source which directs a light beam through the transparent disk and onto the recording head. The light beam is reflected from the head and onto a detector. The detector is coupled to a computer that measures the air bearing thickness from the reflected light beam.

It is also desirable to measure dynamic electrical characteristics of the recording head. The recording head can be dynamically tested in a test apparatus. The test apparatus provides a driving current to the head to initially write a test signal onto a magnetic disk. The magnetic disk is rotated by a spindle motor that is mounted to a test stand. The test apparatus subsequently reads back the test signal through the recording head to measure the performance of the head.

To test an HGA an operator must load the device into the flying height tester to measure the air gap. The device is then removed from the flying height tester and loaded into the dynamic electrical tester for further evaluation. The steps of loading and unloading the HGA is a time consuming process that increases the time required to test the components of a hard disk drive. Additionally, the operator typically loads and unloads the HGAs with twizzers. Such a handling process may damage the parts. It would be desirable to provide a test apparatus that can measure both the air bearing thickness and the dynamic electrical characteristics of an HGA with the same tester.

SUMMARY OF THE INVENTION

The present invention is a tester which can measure both the air bearing thickness and the dynamic electrical characteristics of a head gimbal assembly (HGA) of a hard disk drive. The tester has a disk that is rotated by a spindle motor. The disk has a transparent portion that is used to measure the air bearing thickness and a magnetic portion that used to measure the electrical characteristics. The HGA is moved adjacent to the transparent and magnetic portions by a loader mechanism. The HGA is separated from the rotating disk by an air bearing. The tester has an optical system which measures the thickness of the air bearing when the HGA is adjacent to the transparent portion of the disk. The tester also has an electrical tester which measures the electrical characteristics when the HGA is adjacent to the magnetic portion. The loader mechanism moves the HGA between the transparent and magnetic portions so that the air bearing thickness and the electrical characteristics of an HGA can be measured in the same tester.

DETAILED DESCRIPTION OF THE INVENTION

Figure 1:
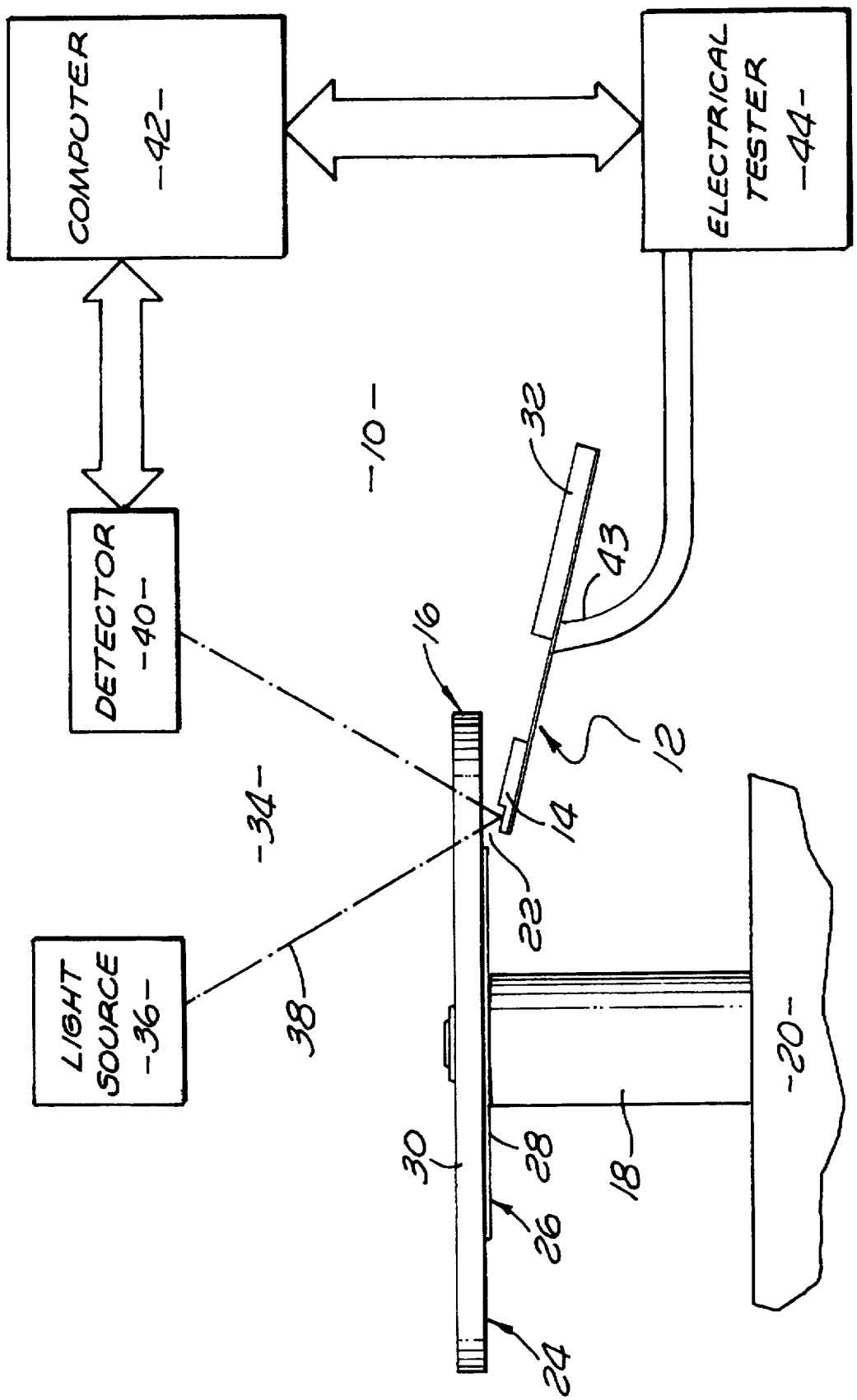
FIG. 1 is a side view of a tester of the present invention.
Figure 2:
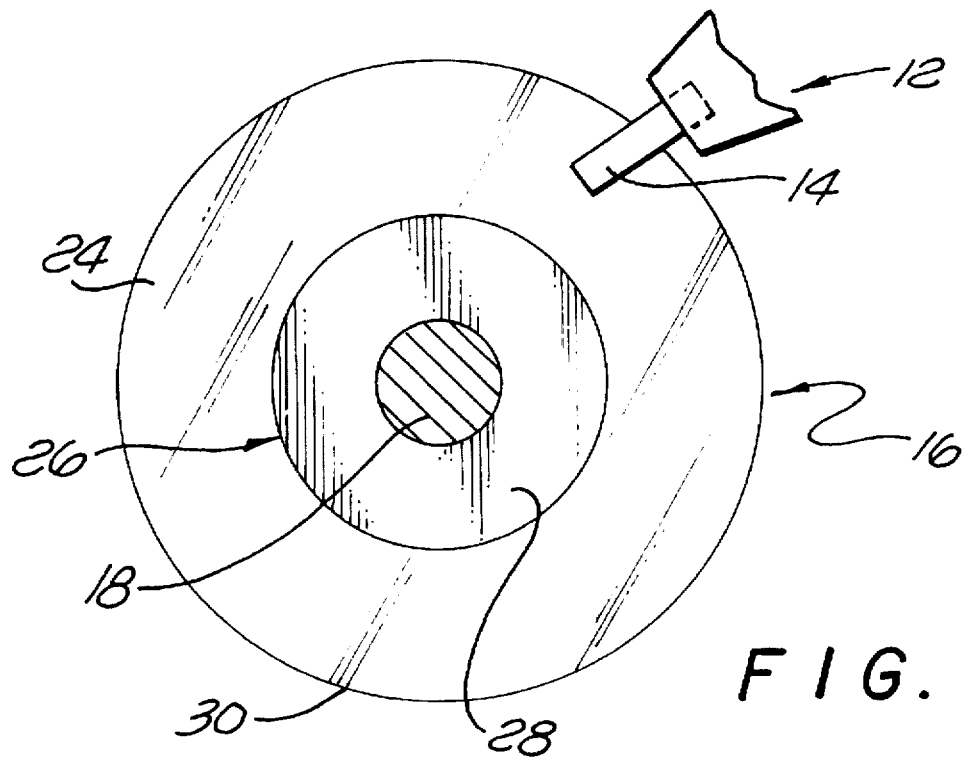
FIG. 2 is a bottom view showing an HGA in a transparent portion of a disk.
Figure 3:
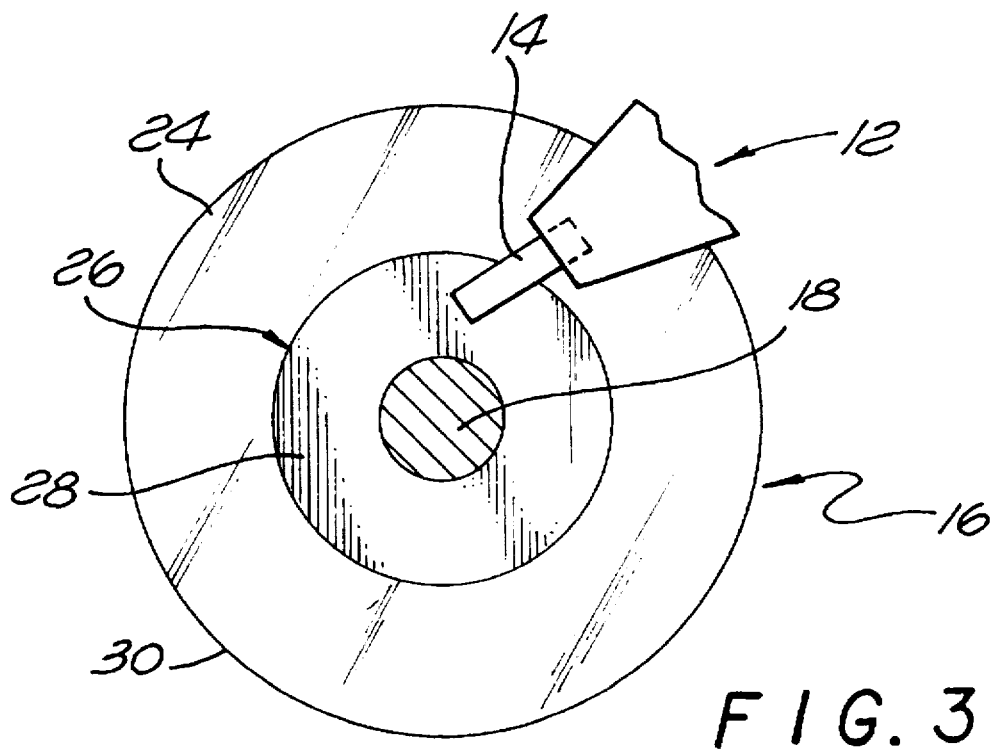
FIG. 3 is a bottom view showing the HGA in a magnetic portion of the disk.

Referring to the drawings more particularly by reference numbers, FIGS. 1 and 2 show a tester 10 of the present invention. The tester 10 can test a head gimbal assembly (HGA) 12 which contains a magnetic recording head 14. The HGA 12 is located adjacent to a disk 16. The disk 16 is rotated by a spindle motor 18 that is mounted to a test stand 20. The rotation of the disk 16 and the hydrodynamic features of the HGA 12 produce an air bearing 22. The air bearing 22 separates the recording head 14 from the surface of the disk 16.

The disk 16 has an outer diameter portion 24 that is optically transparent and an inner diameter portion 26 that has a magnetic material. The optically transparent portion 24 allows the tester 10 to measure the air gap 22 of the HGA 12. The magnetic portion 26 allows the tester 10 to measure electrical characteristics of the HGA 12. The disk 16 can be constructed by applying a magnetic material 28 onto a glass substrate 30. The outer diameter 24 is typically masked during the application of the magnetic material to insure that the magnetic material is not deposited onto the outer portion of the disk. The resulting process provides a disk 16 that has both a magnetic portion 26 and a transparent portion 24.

The HGA 12 is supported by a loader mechanism 32. The loader mechanism 32 can move the HGA 12 between the transparent portion 24 and the magnetic portion 26 of the disk 16. The loader mechanism 32 may also move the HGA 12 toward the disk 16 in a process commonly referred to as a retract routine. By way of example, the loader mechanism 32 may have a voice coil motor (not shown) which rotates an arm of the mechanism 32 and the HGA 12 between the transparent 24 and magnetic 26 portions. Alternatively, the loader mechanism 32 may move the HGA 12 in a linear manner between the magnetic 26 and transparent 24 portions.

The tester 10 has an optical system 34 that measures the thickness of the air bearing 22. The optical system 34 includes a light source 36 that directs a light beam 38 through the transparent portion 24 of the disk 16 and onto the recording head 14. The light beam 38 is reflected from the head 14 onto a detector 40. The detector 40 is coupled to a computer 42 which computes the thickness of the air gap 22 from the reflected light beam. The optical system 32 may be a product, or a modified product, sold by Phase Metrics, Inc. of San Diego, Calif. the assignee of the present invention.

The HGA 12 normally has a pair of electrical wires or pads of a flexible circuit that are connected to the electronics of a hard disk drive. The loader mechanism 32 may have a connector assembly 43 that electrically connects the recording head 14 to an electrical tester 44. The electrical tester 44 may also be connected to the computer 42 for the processing and storing of data.

The electrical tester 44 measures dynamic electrical characteristics of the HGA. For example, the tester 44 may provide a current to the recording head 14 to write a test signal(s) onto the magnetic portion 26 of the disk 16. The tester 44 then reads back the test signal stored on the disk 16 through the same recording head 14. The tester 44 can process the test signal to determine various electrical characteristics of the head 14. The electrical tester 44 may be a product, or a modified product, sold by Phase Metrics, Inc.

In operation, an operator loads an HGA 12 onto the loader mechanism 32. The loader mechanism 32 moves the HGA 12 adjacent to the transparent portion 24 of the disk 16. The optical system 34 then measures the thickness of the air gap 22. The loader mechanism 32 then moves the HGA 12 to the magnetic portion 26 of the disk 16. The electrical tester 44 measures the electrical characteristics of the recording head 14. The loader mechanism 32 moves back to the original position so that the operator can replace the HGA 12 with a new part, wherein the process is repeated. The tester 10 of the present invention thus provides a single apparatus that can measure an air bearing thickness and the electrical characteristics of an HGA 12.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, although the tester is described as initially measuring the air gap thickness and then the electrical characteristics of an HGA, it is to be understood that the tester 10 may first move the head 14 to the magnetic portion 26 of the disk 16 before moving the HGA 12 to the transparent portion 24 of the disk 16.

Figure 4:
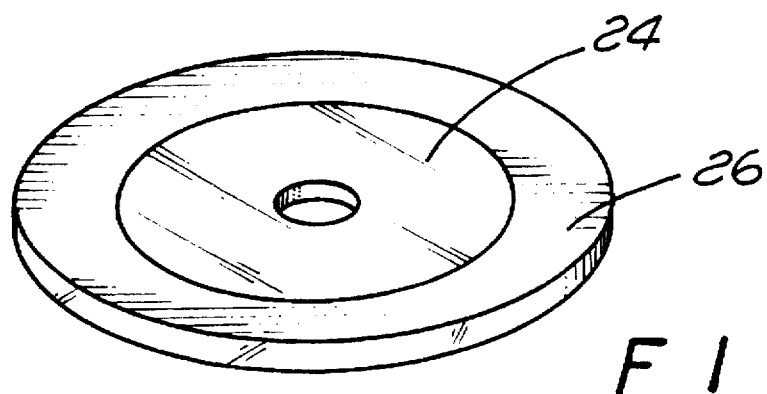
FIG. 4 is a perspective view showing an alternate embodiment of the disk.
Figure 5:
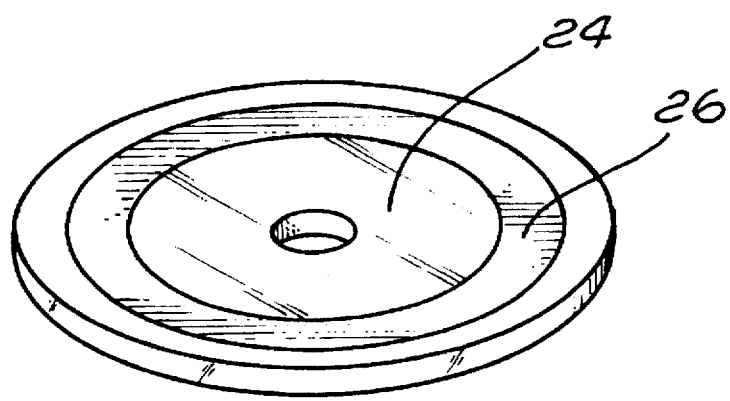
FIG. 5 is a perspective view showing an alternate embodiment of the disk.
Figure 6:
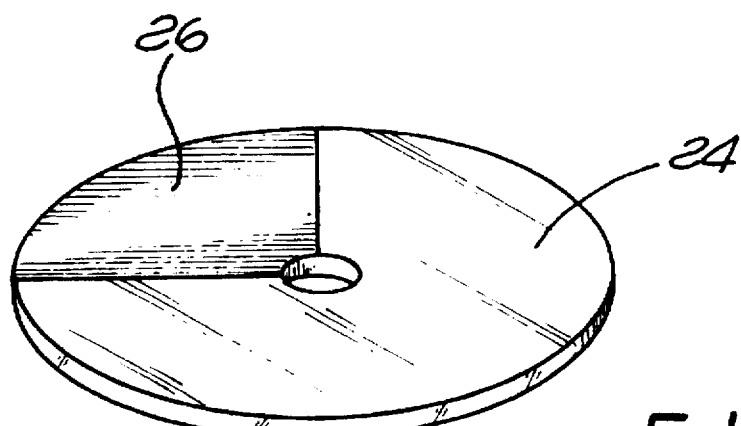
FIG. 6 is a perspective view showing an alternate embodiment of the disk.

As shown in FIGS. 4 and 5, the magnetic portion 26 of the disk may be at the outer disk diameter and the transparent portion 24 may be at the inner disk diameter. FIG. 6 shows another alternative embodiment, wherein the magnetic portion 26 extends over a quadrant of the disk. This embodiment allows the recording head to be tested over the entire radius of the disk. This may be important in testing magneto-resistive(MR) heads which are sensitive to the radial position of the disk.

Figure 7:
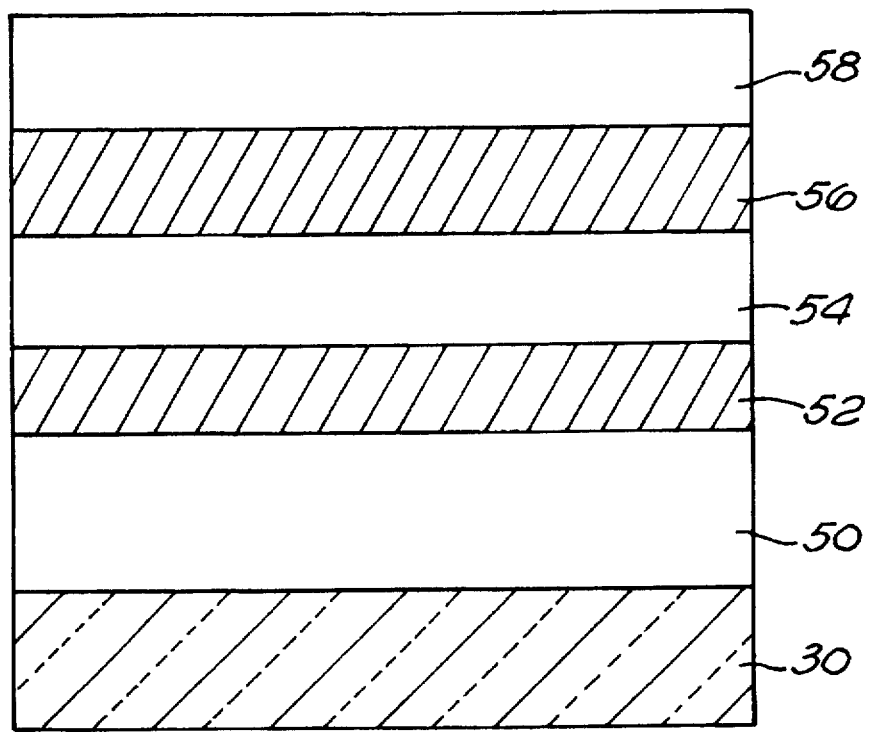
FIG. 7 is a cross-sectional view showing the different layers within the magnetic portion of the disk.

As shown in FIG. 7, the magnetic material 28 may include multiple independent layers 50, 52, 54, 56 and 58. A first layer 50 of NiP may be initially applied to the substrate 30, typically to a thickness of 55 nanometer (nm). Chromium based seed 52 and underlying 54 layers may then be applied at thickness of 0.5–5.0 nm and 50–150 nm, respectively. A magnetic layer 56 of CaNiCr, CoCrTa or CoCrPtTa may be applied to a thickness of 20–60 nm. The magnetic layer 56 may be covered with a diamond-like-carbon protective coating 58 approximately 5–30 nm thick. The materials may be applied by sputtering or other techniques known in the art.

Figure 8:
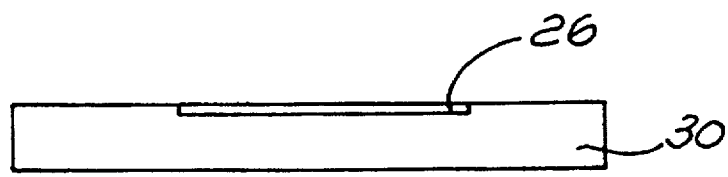
FIG. 8 is a cross-sectional view of a disk.
Figure 9:
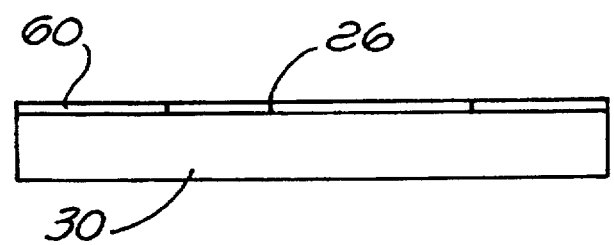
FIG. 9 is a cross-sectional view of a disk.

As shown in FIG. 8, the magnetic portion 26 may be applied to an etched groove of the glass substrate 30. As an alternate embodiment, the magnetic portion 26 may be applied to the top of the substrate 30 and a transparent overcoat 60 may be applied to the remaining portions of the disk so that the thickness of the disk is essentially uniform. The uniform thickness prevents discontinuities in the air bearing thickness so that the slider does not make contact with the disk. Alternatively, the magnetic or transparent portions may have ramped surfaces that prevent the head from crashing into the disk.

What is claimed is:

1. A tester for testing a recording head which has an electrical characteristic, comprising:

a disk which has an optically transparent portion and a magnetic portion;

a spindle motor which rotates said disk;

a loader mechanism which can move the recording head between said optically transparent portion and said magnetic portion, wherein the recording head is separated from said disk by an air gap;

an optical system that measures the air gap when the recording head is adjacent to said optically transparent portion of said disk; and, an electrical tester which measures the electrical characteristic of the recording head when the recording head is adjacent to said magnetic portion of said disk.

2. The tester as recited in claim 1, wherein said optically transparent portion is at an outer diameter of said disk and said magnetic portion is at an inner diameter of said disk.

3. A disk for a tester which optically measures an air gap between a recording head and a disk, and measures an electrical characteristic of the recording head, comprising:

a disk which has an optically transparent portion and a magnetic portion.

4. The tester as recited in claim 3, wherein said optically transparent portion is at an outer diameter of said disk and said magnetic portion is at an inner diameter of said disk.

5. A method for testing a recording head which has an electrical characteristic, comprising the steps of:

a) moving the recording head adjacent to an optically transparent portion of a disk, wherein the recording head is separated from the disk by an air gap;

b) measuring the air gap with an optical system which directs a light beam through the optically transparent portion of the disk;

c) moving the recording head adjacent to a magnetic portion of the disk; and, d) measuring the electrical characteristic of the recording head.

6. A method for constructing a disk for a tester which optically measures an air gap between a recording head and a disk, and measures an electrical characteristic of the recording head, comprising the steps of:

a) providing an optically transparent substrate;

b) applying a magnetic material to a portion of said optically transparent substrate.

7. The method as recited in claim 6, wherein said magnetic material is applied to an inner portion of said optically transparent substrate.

* * * * *